Jan. 31, 1928.
1,657,949
D. WILSON
NUT LOCK
Filed Jan. 12, 1926
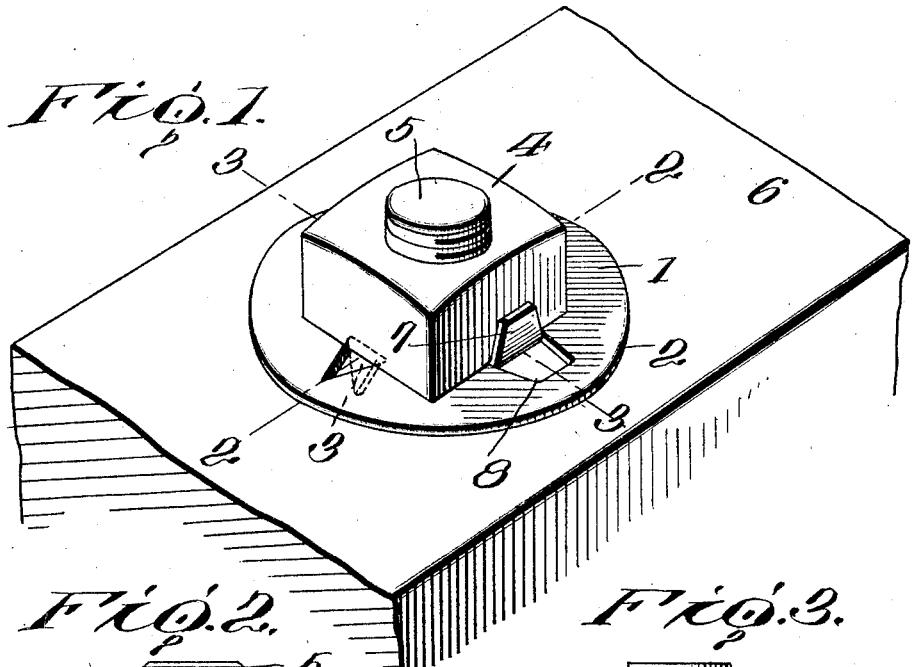
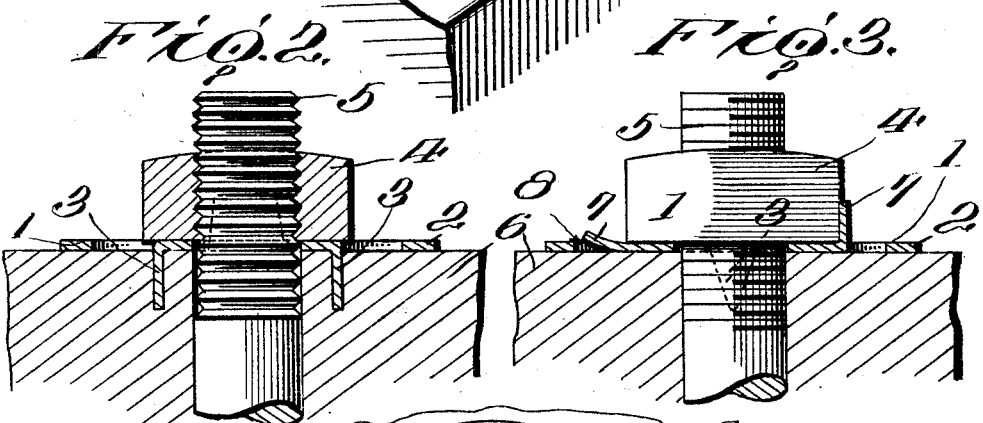
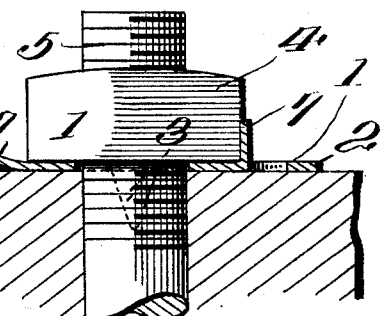
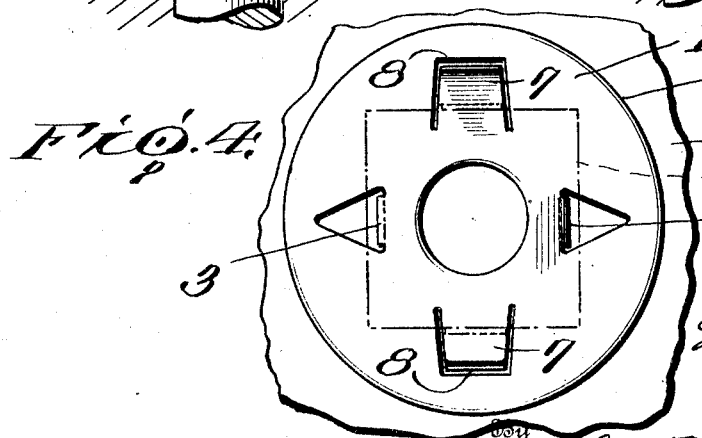
Inventor
David Wilson
By
Sturtevant & Mason
Attorneys Patented Jan. 31, 1928.

1,657,949

UNITED STATES PATENT OFFICE.

DAVID WILSON, OF SPOKANE, WASHINGTON.

NUT LOCK.

Application filed January 12, 1926. Serial No. 80,734.

The invention relates to new and useful improvements in nut-locks and more particularly to a nut-lock which is separate from the nut and which is adapted to engage the nut after it has been turned to clamping position, for preventing the nut from turning.

An object of the invention is to provide a nut-lock which includes a body portion having means for engaging the material being clamped, and also means for engaging the nut and preventing the nut from turning, which body portion is of much larger dimensions than the nut and has a continuous peripheral edge, thus providing an enlarged bearing surface for the nut-lock, whereby the nut-lock is much less liable to become embedded in the material against which it is clamped.

In the drawings which show by way of illustration one embodiment of the invention, Figure 1 is a perspective view showing my improved nut-lock as applied to a bolt and nut and positioned for holding the nut from turning.

Fig. 2 is a sectional view on line 2—2 of Fig. 1.

Fig. 3 is a sectional view on line 3—3 of Fig. 1, but with only one of the clamping lugs for the nut turned up against the side of the nut and with the other clamping lug in its normal position.

Fig. 4 is a plan view of the nut-lock with the nut indicated in broken lines.

My improved nut-lock consists of a body portion which has a continuous unbroken peripheral edge. This body portion is of considerably greater dimensions than the nut. When said nut-lock is used for locking a squared nut there are two projections extending substantially at right angles to the body portion of the nut-lock which are forced into the material for holding the nut-lock from turning, and there are two lugs located in a line at right angles to the line joining the holding projections which are adapted to be turned up against the side of the nut for locking the nut from turning. These holding projections for preventing the nut-lock from turning are cut from the body portion of the nut-lock back from the peripheral edge, and of course are so disposed as to be underneath the nut in all positions of the nut as it is turned, so that the force of the nut is directly over the projections for forcing the same into the material which is to be clamped by the nut.

The holding projections for preventing the nut from turning are also cut from the body portion back from the peripheral edge thereof, and these holding portions are normally raised slightly so that an instrument may be readily inserted beneath the same for raising it into position for holding the nut after the locking washer has been clamped against the material, and the nut turned to a position for locking.

Referring more in detail to the drawings, my improved nut-lock consists of a body portion 1 which, as shown in the drawings, is circular. It is understood of course that it may be otherwise shaped, but it is desirable that the peripheral edge 2 of the nut-lock shall be continuous.

The nut-lock is provided with projections 3—3 as shown in the drawings. These projections are cut from the body portion of the nut-lock and are preferably tapered to a point so that they may be readily embedded in the wood or other material which is clamped by the bolt and nut.

The projection 3 is cut from the body portion some distance back from the peripheral edge thereof, and said projection is located underneath the nut in all positions of the nut during turning, so that the force of the nut will press the projection into the material, and thus firmly hold the body portion of the nut-lock from turning.

The nut-lock, as shown in the drawings, is constructed to hold a square nut 4 threaded onto a bolt 5. The material clamped by the bolt and nut is indicated at 6 and is wood, or any suitable metal which is capable of having the projections 3 embedded therein. If the nut-lock is used in conjunction with materials which cannot be penetrated by the projections 3—3, then, of course, recesses would have to be provided. These projections serve to hold the body portion of the nut-lock from rotation relative to the material which is clamped by the nut.

The body portion of the nut-lock is provided with holding lugs 7—7. These holding lugs are cut from the body portion back from the peripheral edge thereof. After the material has been cut to form the projections 7—7 the projections are slightly raised at the outer edges thereof, as shown at the left in Fig. 3, so that the extreme outer edge of the lug lies slightly above the upper face of the body portion of the nut-lock. This enables an instrument to be readily inserted at the point 8 in Fig. 3, and forced beneath the lug 7, for turning said lug 7 against the side face of the nut after the nut has been turned to a position where it is desired to lock the same. When the instrument has been inserted beneath the outer end of the lug 7, the portion of the washer extending across the end of the lug will serve as a fulcrum for the instrument, so that the lug may be readily pried up. This portion of the washer will also protect the material beneath the washer from being broken or damaged by the instrument when it is used to raise the lug.

As noted, there are two projections 7—7, and in connection with a square nut these projections are preferably disposed in a line which is at right angles to a line containing the projections 3—3. It will be understood, of course, that if the nut has more than four sides, the holding projections for the nut-lock and the holding lugs for the nut may be otherwise disposed. It is essential, however, that the locking lugs for the nut shall be so positioned as to engage a side face of the nut. It will also be noted from the drawing that the locking lugs have their inner portions extending to a line beneath the side face of the nut when the nut is in set position for locking, and thus it is that the locking lug may be turned flat against the side face of the nut making substantial engagement therewith throughout its entire turned portion. By this close fitting of the lug to the side face of the nut when in set position for locking the nut, the lug is not liable to be turned down through the strain of the nut thereagainst. Practically the only thing that will permit the nut to turn would be the sheering off of the upturned portion.

It will be apparent from the drawings that the body portion of the nut-lock is of considerably greater dimensions than the nut, so that said nut-lock projects some distance beyond the side edges of the nut. This provides a much enlarged bearing surface for the nut-lock. The nut-lock therefore performs what might be called a double function; that is, the function of a washer, and also the function of a nut-lock.

When clamping material made of wood or the like, it is very essential that a clamping washer be used in order to prevent the nut from turning into the material or breaking the surface of the material so that water may enter and thus cause the material to rot. By the use of my improved washer and nut-lock the turning of the nut so as to clamp the material does not in any way cut the material, or force the nut-lock into the material, but the washer nut-lock is clamped flat against the side face of the material without breaking the same. This, as above noted, prevents water getting into the material, causing rot, and thus it is that the efficiency of the washer nut-lock is greatly increased. This washer nut-lock may be made of a non-corroding material which will further aid in the protection of the wood under the washer from corrosion, rust and oxidization, whereas without this protection the wood would become weakened much sooner at the already weakened bolt hole. It will be noted from the above that I have provided a combined washer and nut-lock. The body portion of this combined washer and nut-lock may be of flexible sheet metal of sufficient thickness to give the necessary tensile strength, and at the same time, produce a rigid nut-lock and an effective bridge washer from this single piece of metal. The combined washer and nut-lock can be stamped by a single stroke of the punch cooperating with a suitable die at a very minimum cost of labor and production.

It is obvious that minor changes in the details of construction and arrangement of parts may be made without departing from the spirit of the invention as set forth in the appended claim.

What I claim as new and desire to secure by Letters Patent is:—

A nut lock comprising a body portion having a continuous peripheral edge, said body portion being of considerably larger dimensions than the nut with which it is to be used and having the peripheral edges thereof unbroken, whereby said body portion of the nut-lock serves the function of a washer, said body portion having portions cut therefrom back from the peripheral edge, which portions are turned at substantially right angles to the plane of the body portion for holding the nut-lock from turning, said body portion also having locking lugs cut therefrom back from the peripheral edge which are adapted to be turned up against the face of the nut for holding the nut from turning, said last-named lugs having their inner portions extending to a line beneath the side face of the nut when said nut is in set position for locking, with the inner adjacent portions of the lugs over which the corners of the nut pass during the turning of the nut, normally substantially flush with the body portion, and the outer end portions thereof normally raised to a point slightly above the outer face of the body portion of the nut lock, whereby a suitable instrument may be forced beneath the holding lugs for turning the same against the side face of the nut, said peripheral portion at the ends of the lugs serving as a fulcrum for the instrument and to protect the material being clamped during the raising of the lug.

In testimony whereof, I have affixed my signature.

DAVID WILSON.